US012335328B2

United States Patent
Liang

(10) Patent No.: US 12,335,328 B2
(45) Date of Patent: Jun. 17, 2025

(54) INTERNET CALLING METHOD AND APPARATUS, COMPUTER DEVICE, AND STORAGE MEDIUM

(71) Applicant: Tencent Technology (Shenzhen) Company Limited, Guangdong (CN)

(72) Inventor: Junbin Liang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 863 days.

(21) Appl. No.: 17/507,533

(22) Filed: Oct. 21, 2021

(65) Prior Publication Data

US 2022/0044693 A1     Feb. 10, 2022

Related U.S. Application Data

(63) Continuation of application No. PCT/CN2020/120184, filed on Oct. 10, 2020.

(30) Foreign Application Priority Data

Dec. 10, 2019 (CN) .......................... 201911259913.4

(51) Int. Cl.
*H04L 65/80* (2022.01)
*G10L 19/02* (2013.01)
(Continued)

(52) U.S. Cl.
CPC .............. *H04L 65/80* (2013.01); *G10L 19/02* (2013.01); *G10L 19/06* (2013.01); *G10L 19/167* (2013.01);
(Continued)

(58) Field of Classification Search
None
See application file for complete search history.

(56) References Cited

U.S. PATENT DOCUMENTS 6,625,226 B1    9/2003    Gersho et al.
2006/0053006 A1    3/2006    Kim et al.
(Continued)

FOREIGN PATENT DOCUMENTS

CN    101494054 A    7/2009
CN    102543090 A    7/2012
(Continued)

OTHER PUBLICATIONS

W. Li, J. Huang, Y. Liang, J. Liu and F. Gao, "Synthesizing Audio and Video Bitrate Selections via Learning from Actual Requirements," 2022 IEEE International Conference on Multimedia and Expo (ICME), Taipei, Taiwan, 2022, pp. 01-06, doi: 10.1109/ICME52920.2022.9859610. (Year: 2022).*
(Continued)

*Primary Examiner* — Richemond Dorvil
*Assistant Examiner* — Alexander G Marlow
(74) *Attorney, Agent, or Firm* — Crowell & Moring LLP

(57) ABSTRACT

This disclosure provides a network call method and apparatus, a computer device, and a storage medium, and belongs to the field of audio data processing. The method includes: performing time-frequency transformation on an acquired audio signal, to obtain a plurality of pieces of frequency domain information of the audio signal; determining a target bit rate corresponding to the audio signal according to the plurality of pieces of frequency domain information; and encoding the audio signal based on the target bit rate, and performing a network call based on the encoded audio signal.

17 Claims, 7 Drawing Sheets

(51) Int. Cl.
  G10L 19/06     (2013.01)
  G10L 19/16     (2013.01)
  H04B 17/309    (2015.01)
  H04L 65/1083   (2022.01)
  H04L 65/70     (2022.01)
  H04L 65/75     (2022.01)
  H04L 65/752    (2022.01)

(52) U.S. Cl.
  CPC ....... *H04B 17/309* (2015.01); *H04L 65/1083* (2013.01); *H04L 65/70* (2022.05); *H04L 65/75* (2022.05); *H04L 65/752* (2022.05)

(56) References Cited

U.S. PATENT DOCUMENTS

| | | | |
|---|---|---|---|
| 2010/0114566 A1 | 5/2010 | Sung et al. | |
| 2013/0197919 A1* | 8/2013 | Li | G10L 19/002 704/500 |
| 2016/0027450 A1* | 1/2016 | Gao | G10L 19/22 |
| 2018/0316923 A1* | 11/2018 | Stachurski | H04N 19/15 |
| 2019/0348054 A1 | 11/2019 | Sung et al. | |
| 2019/0371349 A1* | 12/2019 | Shahbazi Mirzahasanloo | G10L 19/13 |
| 2020/0099733 A1* | 3/2020 | Chu | H04N 21/8456 |
| 2021/0335378 A1 | 10/2021 | Liang | |

FOREIGN PATENT DOCUMENTS

| | | |
|---|---|---|
| CN | 105162555 A | 12/2015 |
| CN | 106663441 A | 5/2017 |
| CN | 108010533 A | 5/2018 |
| CN | 108989880 A | 12/2018 |
| CN | 110176241 A | 8/2019 |
| CN | 110265046 A | 9/2019 |
| CN | 110992963 A | 4/2020 |
| EP | 1 233 408 A1 | 8/2002 |
| EP | 2 450 881 A2 | 5/2012 |
| JP | 2006-047561 A | 2/2006 |
| WO | WO 2021/114847 A1 | 6/2021 |

OTHER PUBLICATIONS

W. Li, J. Huang, W. Lyu, B. Guo, W. Jiang and J. Wang, "RAV: Learning-Based Adaptive Streaming to Coordinate the Audio and Video Bitrate Selections," in IEEE Transactions on Multimedia, vol. 25, pp. 5662-5675, 2023, doi: 10.1109/TMM.2022.3198013 (Year: 2023).*

I. Shen, B. Tang, A. Alwan and G. Pottie, "A robust variable-rate speech coder," 1995 International Conference on Acoustics, Speech, and Signal Processing, Detroit, MI, USA, 1995, pp. 249-252 vol. 1, doi: 10.1109/ICASSP.1995.479520. (Year: 1995).*

Daniel W. McClary, Violet R. Syrotiuk, Vincent Lecuire, "Adaptive audio streaming in mobile ad hoc networks using neural networks" Ad Hoc Networks, vol. 6, Issue 4, 2008, https://doi.org/10.1016/j.adhoc.2007.04.005. (Year: 2008).*

First Office Action and Search Report for corresponding Chinese application No. 201911259913.4 dated Jun. 29, 2023, 8p.

Concise Explanation of Relevance for C7.

Extended European Search Report for corresponding EP application No. 20899237.0 dated Aug. 31, 2022.

International Search Report and Written Opinion for priority application No. PCT/CN2020/120184 dated Jan. 13, 2021, 12p, in Chinese language.

English language translation of International Search Report for priority application No. PCT/CN2020/120184 dated Jan. 13, 2021, 4p.

Concise Explanation of Relevance for International Written Opinion (A11), 1p.

* cited by examiner

| Critical frequency band | Center frequency (Hz) | Cutoff frequency (Hz) | Bandwidth (Hz) |
|---|---|---|---|
| | | 20 | |
| 1 | 50 | 100 | 80 |
| 2 | 150 | 200 | 100 |
| 3 | 250 | 300 | 100 |
| 4 | 350 | 400 | 100 |
| 5 | 450 | 510 | 110 |
| 6 | 570 | 630 | 120 |
| 7 | 700 | 770 | 140 |
| 8 | 840 | 920 | 150 |
| 9 | 1000 | 1080 | 160 |
| 10 | 1170 | 1270 | 190 |
| 11 | 1370 | 1480 | 210 |
| 12 | 1600 | 1720 | 240 |
| 13 | 1850 | 2000 | 280 |
| 14 | 2150 | 2320 | 320 |
| 15 | 2500 | 2700 | 3580 |
| 16 | 2900 | 3150 | 450 |
| 17 | 3400 | 3700 | 550 |
| 18 | 4000 | 4400 | 700 |
| 19 | 4800 | 5300 | 900 |
| 20 | 5800 | 6400 | 1100 |
| 21 | 7000 | 7700 | 1300 |
| 22 | 8500 | 9500 | 1800 |
| 23 | 10500 | 12000 | 2500 |
| 24 | 13500 | 15500 | 3500 |

FIG. 2

A server obtains a sample data set, the sample data set including a plurality of sample audio signals and sample bit rates corresponding to the plurality of sample audio signals, the plurality of sample audio signals all meeting the same speech quality condition ⎯701

The server inputs a plurality of pieces of sample frequency domain information into an initial model, and the initial model performs bit rate prediction based on the plurality of pieces of sample frequency domain information, to output a plurality of predicted bit rates corresponding to the plurality of pieces of sample frequency domain information ⎯702

The server adjusts a model parameter of the initial model based on difference information between the sample bit rates and the predicted bit rates, continues to train the initial model until the model parameter of the initial model meets a target cut-off condition, and uses the trained initial model as a bit rate prediction model ⎯703

FIG. 7

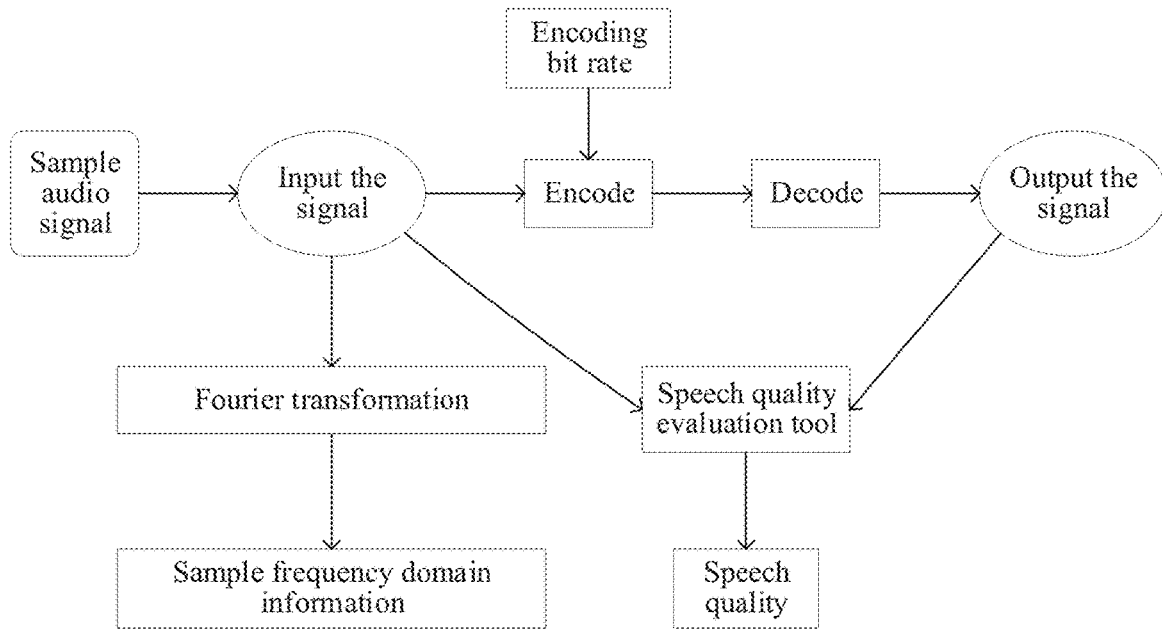

FIG. 8

INTERNET CALLING METHOD AND APPARATUS, COMPUTER DEVICE, AND STORAGE MEDIUM

RELATED APPLICATION

This application is a continuation of International Application No. PCT/CN2020/120184, filed Oct. 10, 2020, which claims priority to Chinese Patent Application No. 201911259913.4, entitled "NETWORK CALL METHOD AND APPARATUS, COMPUTER DEVICE, AND STORAGE MEDIUM" and filed with the National Intellectual Property Administration, PRC. on Dec. 10, 2019. The above applications are incorporated herein by reference in their entireties.

TECHNICAL FIELD

This disclosure relates to the field of audio data processing, and in particular, to a network call method and apparatus, a computer device, and a storage medium.

BACKGROUND

With the advancement of network technologies, more and more people make a call by using a network. The quality of a network call depends on the current network connection quality on the one hand and a bit rate at which an audio signal is encoded on the other hand.

Because the network connection quality is generally uncontrollable, in the related art, an audio encoder is generally set with relevant parameters based on some experimental empirical values before a network call is started, so that the audio encoder encodes an audio signal at a fixed bit rate. Reference is made to FIG. 1 for a network call process in the related art.

However, when the audio signal is encoded at the fixed bit rate, there is no guarantee that the encoded audio signal can be presented to a receiver with better quality, and the effect of the network call is not good.

SUMMARY

Embodiments of this disclosure provide a network call method and apparatus, a computer device, and a storage medium, to improve the quantity of a network call. The technical solutions are as follows.

According to an aspect, a network call method is provided, applicable to a computer device, the method including:
performing time-frequency transformation on an acquired audio signal, to obtain a plurality of pieces of frequency domain information of the audio signal;
determining a target bit rate corresponding to the audio signal according to the plurality of pieces of frequency domain information;
encoding the audio signal based on the target bit rate; and
performing a network call based on the encoded audio signal.

According to an aspect, a network call apparatus is provided, including:
a transformation module, configured to perform time-frequency transformation on an acquired audio signal, to obtain a plurality of pieces of frequency domain information of the audio signal;
a first determining module, configured to determine a target bit rate corresponding to the audio signal according to the plurality of pieces of frequency domain information; and
an encoding module, configured to encode the audio signal based on the target bit rate; and
a call module, configured to perform a network call based on the encoded audio signal.

In some embodiments, the training module includes:
a first transformation unit, configured to perform time-frequency transformation on the plurality of sample audio signals to obtain a plurality of pieces of sample frequency domain information;
an input unit, configured to input the plurality of pieces of sample frequency domain information into an initial model;
a prediction unit, configured to perform, by the initial model, bit rate prediction based on the plurality of pieces of sample frequency domain information, to output a plurality of predicted bit rates corresponding to the plurality of pieces of sample frequency domain information; and
a first adjusting unit, configured to adjust a model parameter of the initial model based on difference information between the sample bit rates and the predicted bit rates, continue to train the initial model until the model parameter of the initial model meets a target cut-off condition, and use the trained initial model as the bit rate prediction model.

In some embodiments, the transformation module includes:
a first dividing unit, configured to divide the audio signal into a plurality of audio frames, two audio frames adjacent in time having an overlapping part;
a windowing unit, configured to perform windowing on the audio frames to obtain a plurality of windowed audio frames; and
a second transformation unit, configured to perform Fourier transformation on the plurality of windowed audio frames to obtain the plurality of pieces of frequency domain information.

In some embodiments, the second transformation unit includes:
a transformation subunit, configured to perform Fourier transformation on the plurality of windowed audio frames to respectively obtain linear frequency-domain parameters of the audio frames;
a first obtaining subunit, configured to respectively obtain linear frequency-domain-power-spectrum values of the audio frames based on the linear frequency-domain parameters of the audio frames;
a second obtaining subunit, configured to obtain a plurality of Bark-domain-power-spectrum values based on the linear frequency-domain-power-spectrum values of the audio frames; and
an operation subunit, configured to perform a logarithmic operation on the plurality of Bark-domain-power-spectrum values to obtain the plurality of pieces of frequency domain information.

In some embodiments, the determining unit includes:
a bit rate group division subunit, configured to divide first bit rates having the same bit rate in the plurality of first bit rates into a bit rate group;
a bit rate group determining subunit, configured to obtain a quantity of the first bit rates included in each bit rate group, and determine a bit rate group including the largest quantity of the first bit rates as a target bit rate group; and a target bit rate determining subunit, configured to determine the first bit rate included in the target bit rate group as the target bit rate.

In some embodiments, the transformation module is further configured to extract a human voice signal from the audio signal, perform time-frequency transformation on the human voice signal to obtain a plurality of pieces of frequency domain information of the human voice signal, and use the plurality of pieces of frequency domain information of the human voice signal as the plurality of pieces of frequency domain information of the audio signal; or recognize a start time point and an end time point of a human voice in the audio signal, and perform time-frequency transformation on an audio signal between the start time point and the end time point to obtain the plurality of pieces of frequency domain information of the audio signal.

According to an aspect, a computer device is provided, including one or more processors and one or more memories, the one or more memories storing at least one program code, the program code being loaded and executed by the one or more, causing the computer device to perform steps, comprising:

performing time-frequency transformation on an acquired audio signal, to obtain a plurality of pieces of frequency domain information of the audio signal;

determining a target bit rate corresponding to the audio signal according to the plurality of pieces of frequency domain information;

encoding the audio signal based on the target bit rate; and performing a network call based on the encoded audio signal.

According to an aspect, a non-transitory computer-readable storage medium is provided, storing at least one program code, the program code being loaded and executed by a processor to cause a computer device to perform the steps comprising:

performing time-frequency transformation on an acquired audio signal, to obtain a plurality of pieces of frequency domain information of the audio signal;

determining a target bit rate corresponding to the audio signal according to the plurality of pieces of frequency domain information; and encoding the audio signal based on the target bit rate, and performing a network call based on the encoded audio signal.

The technical solutions provided by the embodiments of this disclosure may use a non-fixed encoding bit rate to encode audio signals, but determine different target bit rates for different audio signals for encoding, so that a solution of individualized encoding performed on different audio signals during a network call is implemented. Compared with encoding with a fixed bit rate, the technical solutions provided by the embodiments of this disclosure have a better network call effect.

BRIEF DESCRIPTION OF THE DRAWINGS

To describe technical solutions in embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other accompanying drawings from these accompanying drawings without creative efforts.

FIG. 2 is a schematic diagram of a correspondence between Bark domain and linear frequencies according to an embodiment of this disclosure.

FIG. 7 is a flowchart of a method for training a bit rate prediction model according to an embodiment of this disclosure.

FIG. 8 is a schematic structural diagram of training a bit rate prediction model according to an embodiment of this disclosure.

DESCRIPTION OF EMBODIMENTS

To make objectives, technical solutions, and advantages of this disclosure clearer, the following further describes implementations of this disclosure in detail with reference to the accompanying drawings.

Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, the AI is a comprehensive technology of computer science, which attempts to understand essence of intelligence and produces a new intelligent machine that can respond in a manner similar to human intelligence. The AI is to study the design principles and implementation methods of various intelligent machines, to enable the machines to have the functions of perception, reasoning, and decision-making.

The AI technology is a comprehensive discipline, covering a wide range of fields including both a hardware-level technology and a software-level technology. The basic AI technology generally includes a technology such as a sensor, a dedicated AI chip, cloud computing, distributed storage, a big data processing technology, an operation/interaction system, or mechatronics. An AI software technology mainly includes fields such as a computer vision (CV) technology, a speech processing technology, a natural language processing technology, and machine learning (ML)/deep learning (DL).

ML is a multi-field interdiscipline, and relates to a plurality of disciplines such as the probability theory, statistics, the approximation theory, convex analysis, and the algorithm complexity theory. The ML specializes in studying how a computer simulates or implements a human learning behavior to obtain new knowledge or skills, and reorganize an existing knowledge submodel, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

Fourier transformation is a time-frequency transformation method, which can transform signals in time domain to frequency domain through the Fourier transformation.

Bark domain is a psychological scale of sound. Reference is made to FIG. 2 for an example of a correspondence between the Bark domain and linear frequencies.

Figure 1:
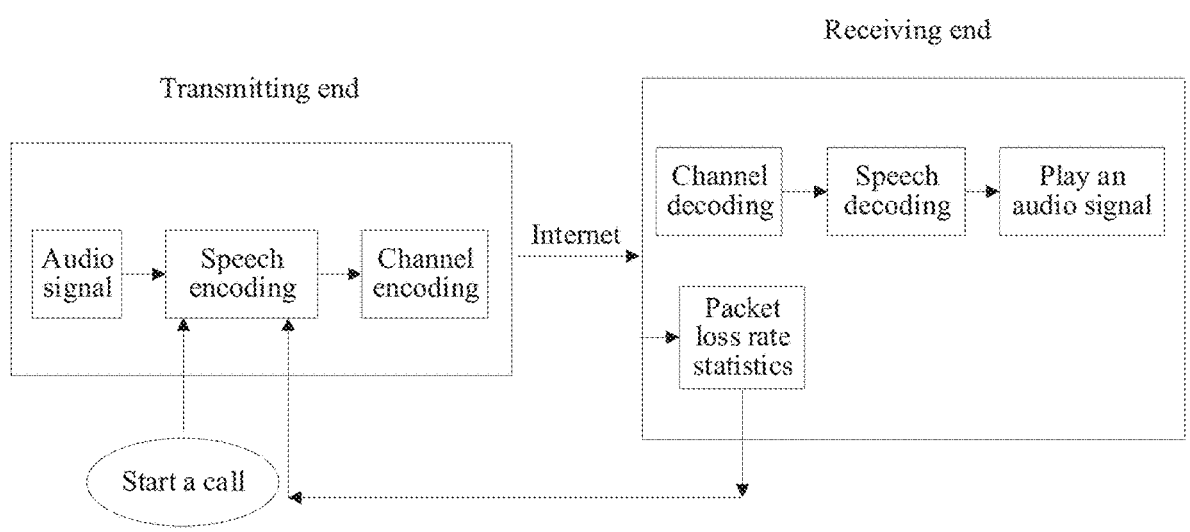
FIG. 1 is a schematic structural diagram of a transmitting end and a receiving end of a network call in the related art.
Figure 3:
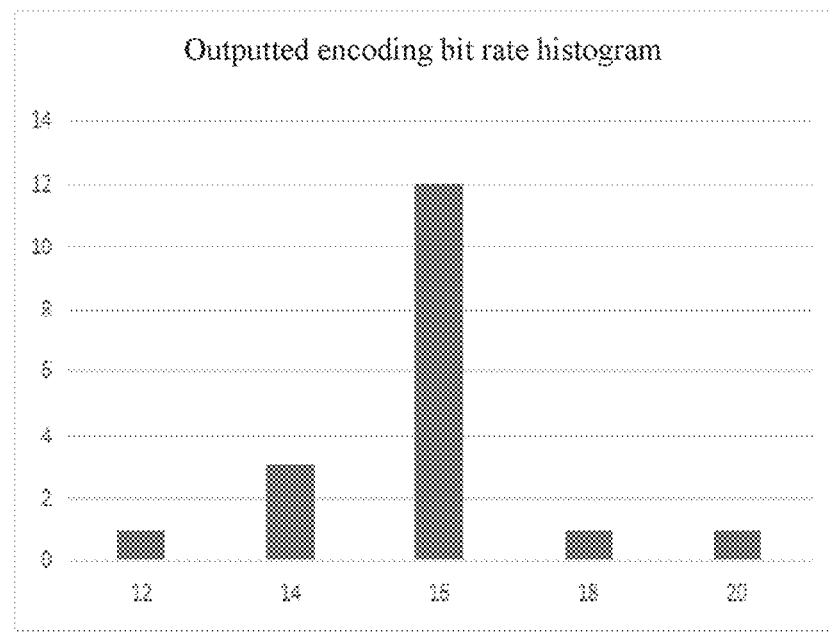
FIG. 3 is a schematic diagram of a histogram according to an embodiment of this disclosure.

Histogram statistics is a statistical method. The method includes: performing n repeated measurements on a specific physical quantity under the same condition, to obtain a series of measured values; finding a maximum value and a minimum value, and then determining an interval to enable the interval to include all measurement data; dividing the interval into a plurality of short intervals, and counting frequencies M appearing in each short interval in measurement results; and drawing the short intervals and corresponding frequency heights by using measured data as horizontal ordinates and the frequencies M as vertical ordinates, to obtain a histogram, that is, a statistical histogram. Reference is made to FIG. 3 for an example of the histogram.

A power spectrum is a power spectral density function for short, which is defined as signal power in a unit frequency band. The power spectrum shows a changing status of signal power with frequency, that is, a distribution status of signal power in frequency domain.

A mean opinion score (MOS), also known as a MOS, is an index of measuring the speech quality of a communication system.

The solutions provided in the embodiments of this disclosure involve technologies such as AI and ML, and are described by using the following embodiments.

Figure 4:
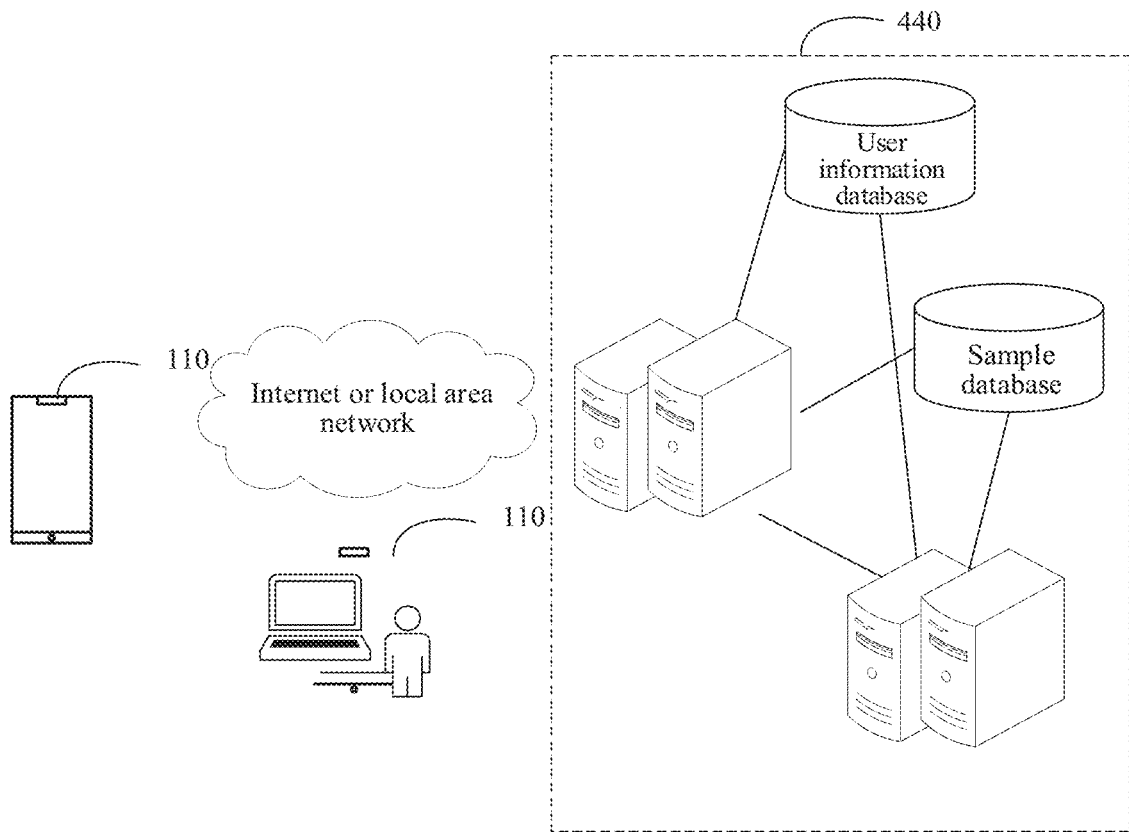
FIG. 4 is a schematic diagram of an implementation environment according to an embodiment of this disclosure.

FIG. 4 is a schematic diagram of an implementation environment of a network call method according to an embodiment of this disclosure. Referring to FIG. 4, the implementation environment includes a terminal 110 and a server 440.

The terminal 110 is connected to the server 410 by using a wireless network or a wired network. In some embodiments, the terminal 110 may be a smartphone, a tablet computer, a portable computer, or the like. An application supporting a network call method is installed and run on the terminal 110. For example, the terminal 110 is a terminal used by a user, and the application program running on the terminal 110 logs in to a user account.

The terminal 110 is connected to the server 440 by using a wireless network or a wired network.

In some embodiments, the server 440 includes: an access server, a network call server, and a database. The access server is configured to provide an access service for the terminal 110. The network call server is configured to provide background services related to network calls. In some embodiments, the database includes a user information database, a sample database, and like. Certainly, different services provided by the server can further correspond to different databases. In some embodiments, there are one or more network call servers. When there are a plurality of network call servers, at least two network call servers are configured to provide different services, and/or at least two network call servers are configured to provide the same service, for example, provide the same service in a load balancing manner. This is not limited in the embodiments of this disclosure.

A person skilled in the art may learn that there may be more or fewer terminals 110. For example, there may be only one terminal 110, or there may be dozens of or hundreds of or more terminals. In this case, another terminal may be further included in the foregoing application environment. This embodiment only uses the terminal 110 as an example. The quantity and the device type of the terminals 110 are not limited in the embodiments of this disclosure.

Figure 5:
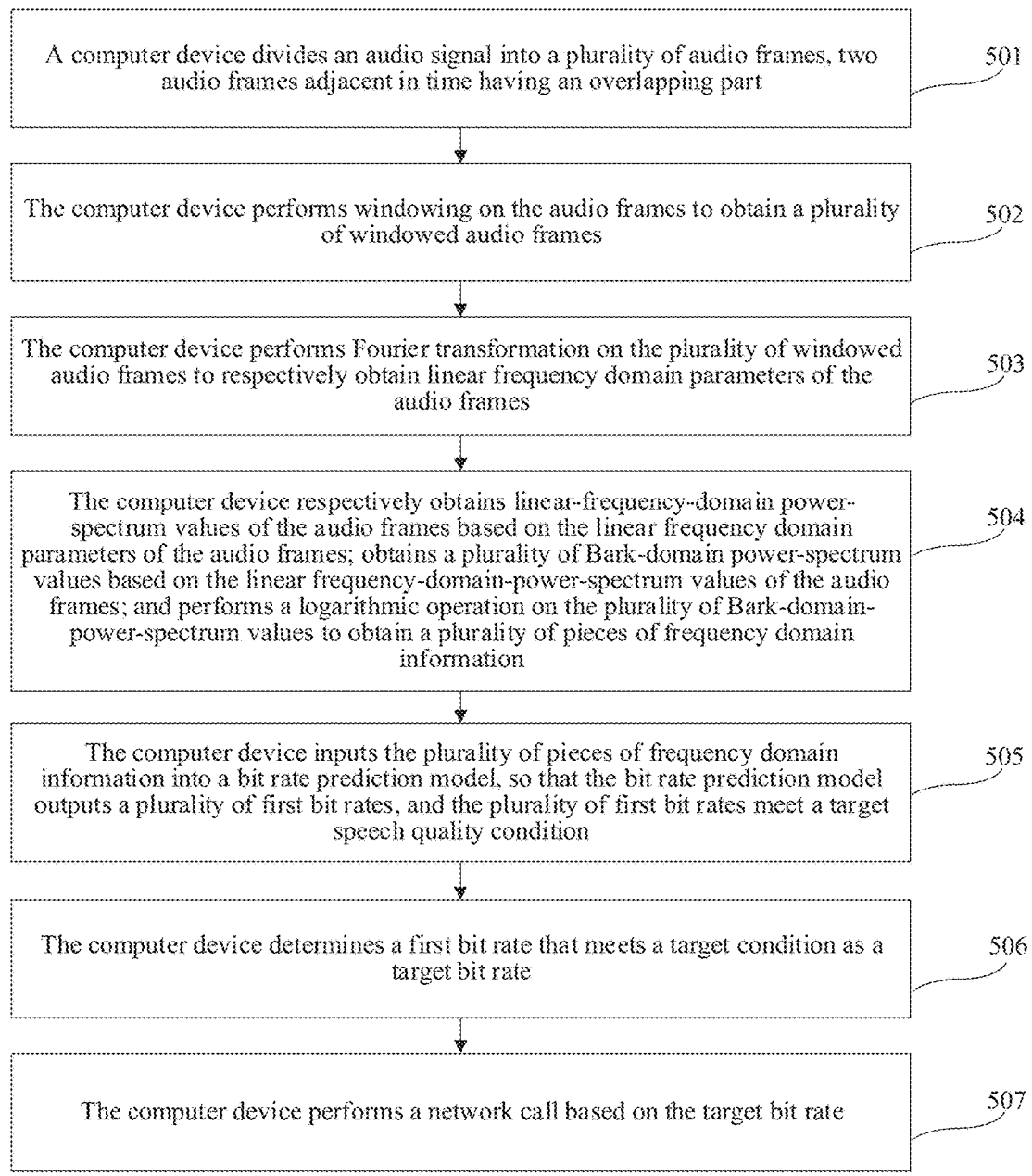
FIG. 5 is a flowchart of a network call method according to an embodiment of this disclosure.
Figure 6:
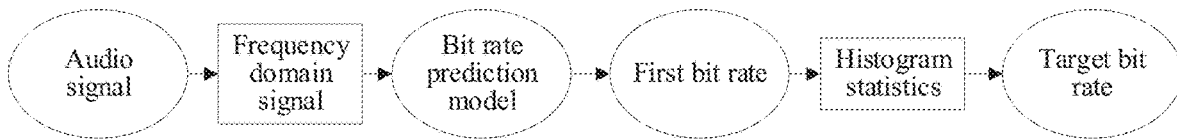
FIG. 6 is a flowchart of a network call method according to an embodiment of this disclosure.

FIG. 5 is a flowchart of a network call method according to an embodiment of this disclosure, and FIG. 6 is also a flowchart of a network call method according to an embodiment of this disclosure. With reference to FIG. 5 and FIG. 6, the network call method provided by the embodiments of this disclosure is understood more clearly. Refer to FIG. 5 and FIG. 6, the method includes the following steps.

501: A computer device divides an audio signal into a plurality of audio frames, two audio frames adjacent in time having an overlapping part.

Any sound is essentially a sound wave generated by the vibration of an object. An audio signal acquisition device may acquire an audio signal by transforming a sound wave generated by such a vibration into an electrical signal. The electrical signal acquired by the audio signal acquisition device is a changing status of voltage over time. The voltage herein can be used for representing a changing status of a sound to a certain extent. Time domain describes a changing status of a variable over time, and the audio signal acquired by the audio signal acquisition device is located in the time domain.

Because the audio signal changes greatly over time, the audio signal is unstable as a whole. In order to facilitate analysis, the computer device can divide a received audio signal into frames, and decompose an overall unstable audio signal into a plurality of audio frames, and the plurality of audio frames can be considered stable locally. In this way, the computer device performs time-frequency transformation on the decomposed audio frame, and can obtain more realistic frequency domain information. In some embodiments, the computer device sets an overlapping part on two audio frames adjacent in time, and the overlapping part between the two audio frames is referred to as a frame shift. For example, a part of a frame tail of a previous frame and a frame head of the next frame are overlapped, which can ensure a smooth transition between the audio frames and is convenient for subsequent analysis and processing performed by the computer device.

In some embodiments, the computer device divides the audio signal in the time domain into the plurality of audio frames based on a target frame length and a target frame shift. The target frame length is set according to an actual situation, and the target frame shift may be set according to the target frame length, for example, one-half of the target frame length or one-third of the target frame length. The setting manner and magnitude of the target frame length and the target frame shift are not limited in the embodiments of this disclosure.

In some embodiments, the computer device extracts a human voice signal from the audio signal and divides the human voice signal into a plurality of audio frames. The following describes a manner in which the computer device extracts the human voice signal by using a plurality of examples.

Example 1: The computer device can obtain a noise signal and remove the noise signal from the audio signal to obtain the human voice signal. If a microphone for noise reduction is provided on the computer device, the computer device can use a sound signal acquired by the microphone for noise reduction as a noise signal, and the computer device can obtain the human voice signal based on the noise signal.

Example 2: If there is no microphone for noise reduction provided on the computer device, the computer device can remove a noise signal from the audio signal based on waveforms of different noise signals to obtain the human voice signal.

Because the waveforms of some noise signals overlap with the human voice signal, directly removing the noise signal from the audio signal may affect the quality of a network call. The computer device can then superpose the human voice signal and the noise signal based on a target weight and perform subsequent processing on the superposed audio signal, which can improve the quality of the network call. Alternatively, the computer device can obtain a start time point and an end time point of a human voice from the audio signal, divide an audio signal between the start time point and the end time point, and perform subsequent processing.

Example 3: During a call, a user tends to get close to a terminal to make a call. Therefore, the computer device can also extract the human voice signal from the audio signal according to the volume. For example, the computer device determines a signal with a high volume as a human voice signal and a signal with a low volume as a noise signal, and extracts the human voice signal from the audio signal.

502: The computer device performs windowing on the audio frames to obtain a plurality of windowed audio frames.

In some embodiments, the computer device can use different window functions to perform windowing based on different audio signals. For example, the computer device multiplies an audio frame and a window function to obtain a windowed audio frame. The options of window functions include a Hamming window, a Hanning window, a triangular window, a Blackman window, a Kaiser window, and the like.

A process in which the computer device transforms the audio signal from the time domain to the frequency domain through Fourier transformation is actually to decompose an original audio signal into a signal superimposed by a plurality of trigonometric functions. A processed object of the Fourier transformation is a continuous periodic function. That is, Fourier transformation is performed on an original audio signal by using the original audio signal as a whole cycle. However, audio signals acquired by the audio acquisition device may be discontinuous at separation points of audio frames. After time-frequency conversion, the discontinuous separation points appear as high-frequency components in the frequency domain, and the high-frequency components do not exist in the original audio signal. In order to reduce the impact of such a case, windowing is performed on the audio frames, so that the separation points between two adjacent audio frames become continuous.

503: The computer device performs Fourier transformation on the plurality of windowed audio frames to respectively obtain linear frequency-domain parameters of the audio frames.

Through the audio signal in the time domain, a changing status of the audio signal over time can be clearly understood, and frequency domain information can reflect the composition of the audio signal. After the audio signal is transformed into the frequency domain information through Fourier transformation, the complex audio signal can be divided into simple audio signals. The composition of the audio signal can be clearly understood through the frequency domain information. The audio signal acquisition device can easily acquire audio signals in the time domain, and the computer device can conveniently process frequency domain information. Therefore, before the audio signal is processed by the computer device, the audio signal in the time domain is transformed into frequency domain information.

The following describes, by using an example in which the window function used by the computer device is a Hanning window and the target frame length is 20 ms, the method for obtaining a linear frequency-domain parameter of the audio frame in this embodiment of this disclosure. Certainly, in the foregoing process, the computer device can also use another window function and another target frame length to perform step 503. This is not limited in the embodiments of this disclosure.

A window function of the Hanning window is formula (1).

$$\text{win}(n) = 0.5 \times \left(1 + \cos\left(2\pi \frac{n}{N-1}\right)\right) \tag{1}$$

A window function of Fourier transformation is formula (2)

$$X(i,k) = \sum_{n=0}^{N-1} x(n) \, \text{win}(n) e^{-j\frac{2\pi nk}{N}} \tag{2}$$

where X (i, k) is a linear frequency-domain parameter, x (n) is an audio signal, n is the length of the audio frame, $$n \in \left[-\frac{N-1}{2}, \frac{N-1}{2}\right],$$

N is a quantity of audio frames, N is a positive integer, k is an index point number, k=1, 2, 3, . . . , or N, i is a sequence number of the audio frame, and j represents a complex number.

504: The computer device respectively obtains linear frequency-domain-power-spectrum values of the audio frames based on the linear frequency-domain parameters of the audio frames; obtains a plurality of Bark-domain-power-spectrum values based on the linear frequency-domain-power-spectrum values of the audio frames; and performs a logarithmic operation on the plurality of Bark-domain-power-spectrum values to obtain a plurality of pieces of frequency domain information.

In some embodiments, the computer device processes the linear frequency-domain parameters of the audio frames based on formula (3), to obtain the linear frequency-domain-power-spectrum values.

$$S(i,k) = |X(i,k)|^2 \tag{3}$$

where S (i, k) is the linear frequency-domain-power-spectrum value.

After obtaining the linear frequency-domain-power-spectrum value, the computer device obtains the Bark-domain-power-spectrum value based on formula (4). For an example of a correspondence between Bark domain and frequencies, refer to FIG. 2. This embodiment of this disclosure is performed only for a network call, and therefore, only critical frequency bands of 1 to 22 in the Bark domain need to be analyzed.

$$S_{bark}(i, m) = \frac{1}{f_{top}(m) - f_{bottom}(m) + 1} \times \sum_{j=f_{bottom}(m)}^{f_{top}(m)} S(i, j) \quad (4)$$

where $f_{top}$ and $f_{bottom}$ are respectively critical frequency band numbers of the Bark domain.

After obtaining the Bark-domain-power-spectrum values, the computer device performs a logarithmic operation on the Bark-domain-power-spectrum values (formula 5) to obtain the plurality of pieces of frequency domain information.

$$w = \text{Log}(S_{bark}) \quad (5)$$

The foregoing steps 501 to 504 are an exemplary implementation, in which the computer device performs time-frequency transformation on the acquired audio signal to obtain the plurality of pieces of frequency domain information. Certainly, the computer device can also transform the audio signal into the frequency domain information in another manner. Information, such as wavelet transformation. This is not limited in the embodiments of this disclosure.

505: The computer device inputs the plurality of pieces of frequency domain information into a bit rate prediction model, so that the bit rate prediction model outputs a plurality of first bit rates, and the plurality of first bit rates enable the speech quality of the network call to meet a target speech quality condition.

In some embodiments, the bit rate prediction model is trained by using a plurality of sample audio signals and sample bit rates corresponding to the plurality of sample audio signals, and has the ability to output a corresponding bit rate according to the audio signal. After the sample audio signals are encoded and decoded with corresponding sample bit rates of the sample audio signals, speech qualities obtained are the same. If mean opinion scores (MOSs) are used for representing the speech qualities, the MOSs are the same. For a model training process, refer to the following steps S701 to S703.

For example, a MOS of a normal network call is in an interval (3, 4.5), and the computer device can select different bit rate prediction models for different usage scenarios. Bit rate prediction models corresponding to different MOSs are obtained by using the method for training a bit rate prediction model provided by the embodiments of this disclosure, and the computer device can select corresponding bit rate prediction models based on quality requirements of different network calls. For example, a network call requires high call quality, and a MOS of the network call is required to be 4.2. In this case, the computer device calls a bit rate prediction model trained by using sample audio signals with a MOS of 4.2 and sample bit rates corresponding to the sample audio signals, inputs a plurality of pieces of frequency domain information into the bit rate prediction model, predicts a plurality of first bit rates based on the frequency domain information by using the bit rate prediction model, and uses the plurality of first bit rates for encoding, so that the MOS of the network call can be kept at 4.2.

The first bit rates described herein refer to bit rates output by the same bit rate prediction model, and do not mean that bit rate values represented by the first bit rates are the same.

506: The computer device determines a first bit rate that meets a target condition from the plurality of first bit rates as a target bit rate.

In some embodiments, the computer device obtains a quantity of first bit rates having the same bit rate from the plurality of first bit rates, determines the first bit rate with the largest quantity as the target bit rate, and encodes the audio signal based on the target bit rate to perform the network call.

For example, the computer device divides first bit rates having the same bit rate in the plurality of first bit rates into a bit rate group. The computer device obtains a quantity of the first bit rates included in each bit rate group, and determines a bit rate group including the largest quantity of the first bit rates as a target bit rate group. The computer device determines the first bit rate included in the target bit rate group as the target bit rate. For example, the computer device inputs five pieces of frequency domain information into the bit rate prediction model, and the bit rate prediction model outputs five first bit rates correspondingly. If three in five first bit rates have a first bit rate of 128 Kbps, one has a first bit rate of 256 Kbps, and another first bit rate is 150 Kbps, the computer device divides the first bit rates with a bit rate of 128 Kbps into a first bit rate group, divides the first bit rate with a bit rate of 256 Kbps into a second bit rate group, and divides the first bit rate with a rate of 150 Kbps into a third bit rate group. The computer device determines that a quantity of the first bit rates included in the first bit rate group is 3, and a quantity of the first bit rates included in the second bit rate group is 1, and a quantity of the first bit rates included in the third bit rate group is 1. The computer device determines the first bit rate group as the target bit rate group, and uses the first bit rate in the first bit rate group as the target bit rate, that is, 128 Kbps.

In some embodiments, the computer device can use a histogram statistics method for the plurality of first bit rates to obtain the target bit rate. Reference is made to FIG. 3 for the form of the histogram. In FIG. 3, the a-axis (horizontal axis) is an encoding bit rate and the y-axis (vertical axis) is a frequency corresponding to the encoding bit rate. The computer device performs histogram statistics according to the plurality of first bit rates, collects frequencies of the same first bit rates, and generates a histogram. The first bit rate having the highest frequency in the histogram is determined as the target bit rate.

507: The computer device performs a network call based on the target bit rate.

In some embodiments, the computer device encodes the acquired audio signal based on the target bit rate, and transmits the encoded audio signal to a server. The server transmits the audio signal to a receiver of the audio signal to implement the network call.

In an example in which the computer device is a smartphone, if a user A wants to make a network call with a user B, the user A transmits a network call request to the server by using a smartphone A, and the network call request carries an account identifier of the user B. The server transmits, according to the account identifier of the user B, a connection request to a smartphone B logged in with an account of the user B. In response to that the user B operates the smartphone B to accept the connection request, the smartphone A encodes, based on the target bit rate, an audio signal acquired when the user A speaks. A smartphone A transmits the encoded audio signal to the server, and the server transmits the encoded audio signal to the smartphone B. The smartphone B decodes the encoded audio signal, and plays the decoded audio signal, so that the user B can hear the content that the user A wants to express. In some embodiments, the bit rate prediction model provided by this disclosure also exists in the smartphone B. Therefore, the smartphone B can encode, based on the target bit rate outputted by the bit rate prediction model, an audio signal acquired when the user B speaks. The smartphone B transmits the encoded audio signal to the server, and the server transmits the encoded audio signal to the smartphone A. The smartphone A decodes the encoded audio signal, and plays the decoded audio signal, so that the user A can hear the content that the user B wants to express. Through the interaction between the smartphone A and the smartphone B, a network call with better quality can be implemented between the user A and the user B.

All of the above exemplarily technical solutions are combined randomly to form optional embodiments of this disclosure. Details are not described herein again.

Through the network call method provided by this embodiment of this disclosure, a computer device performs time-frequency transformation on an audio signal to obtain frequency domain information, and a trained bit rate prediction model predicts a target bit rate based on the frequency domain information. Because the bit rate prediction model is trained based on sample audio signals corresponding to specific speech quality and sample bit rates, a relationship between the audio signal and the speech quality is considered when the model performs bit rate prediction. That is, when the model is used for performing bit rate prediction, the goal of encoding is to make the audio signal get the specific speech quality. The audio signal is adjusted by using the target bit rate outputted by the model, so that the speech quality of a network call is more stable and the quality of the network call is better.

FIG. 7 is a flowchart of a method for training a bit rate prediction model according to an embodiment of this disclosure, and FIG. 8 is a structural diagram of training a bit rate prediction model according to an embodiment of this disclosure. With reference to FIG. 7 and FIG. 8, the method for training a bit rate prediction model provided by the embodiments of this disclosure is understood more clearly. Reference is made to FIG. 7 and FIG. 8 by using an example in which an execution entity is a server, the method includes the following steps.

701: A server obtains a sample data set, the sample data set including a plurality of sample audio signals and sample bit rates corresponding to the plurality of sample audio signals, the plurality of sample audio signals all meeting the same speech quality condition.

That plurality of sample audio signals all meets the same speech quality condition refers to that after the plurality of sample audio signals are respectively encoded by using the sample bit rates corresponding to the plurality of sample audio signals, the audio signals obtained all meet the same speech quality condition.

In some embodiments, the server transmits a sample data set obtaining request to a sample database maintained by the server, and the sample database returns the sample data set to the server based on the sample data set obtaining request. The server performs time-frequency transformation on the sample audio signals in the sample data set to obtain sample frequency domain information.

In some embodiments, the server may alternatively construct a sample data set by itself in the following manner: The server acquires a plurality of sample audio signals, encodes the sample audio signals according to various bit rates, and transmits the encoded sample audio signals to a communication server, so that the communication server returns the encoded sample audio signals to the server, and the server decodes the encoded sample audio signals to obtain a plurality of decoded sample audio signals. In this way, a real network call situation can be simulated, the decoded sample audio signals obtained are more in line with a real situation, and a bit rate predicted by a bit rate prediction model trained by the server based on the decoded sample audio signals and the sample audio signals is more reliable.

After obtaining the plurality of decoded sample audio signals, the server can obtain, based on the plurality of sample audio signals and the plurality of decoded sample audio signals, speech qualities of the plurality of sample audio signals that are encoded and decoded at different bit rates. For example, a MOS may be used for speech quality evaluation. In addition, the server performs time-frequency transformation on the plurality of sample audio signals to obtain a plurality of pieces of sample frequency domain information, and uses the plurality of pieces of sample frequency domain information to represent the plurality of sample audio signals, so that time-frequency transformation does not need to be performed on the sample audio signals in a subsequent model training process again, thereby improving training efficiency. In some embodiments, the server records sample frequency domain information, MOSs, and encoding bit rates by constructing Table 1.

TABLE 1

| Sample number | Sample frequency domain information | MOS | Encoding bit rate |
|---|---|---|---|
| 1 | [2, 8, 11, 10, . . . ] | 3.5 | 128 |
| 2 | [2, 9, 11, 12, . . . ] | 4.1 | 150 |
| . . . | . . . | . . . | . . . |

After the construction of Table 1 is completed, the server determines sample data with the same speech quality as a sample data set, that is, determines sample frequency domain information and encoding bit rates with the same MOS as a sample data set. One sample data set corresponds to one MOS. Different sample data sets are used for training different bit rate prediction models. After the server performs training by using different sample data sets, an obtained bit rate prediction model performs bit rate prediction with a purpose that a predicted bit rate can make the speech quality of the audio signal reach the speech quality during training of the bit rate prediction model. For example, the server uses a sample data set corresponding to a MOS of 3.5 to train an initial model, and can obtain a bit rate prediction model corresponding to the MOS of 3.5. The audio signal is encoded by using a bit rate predicted by the bit rate prediction model, so that a MOS of the encoded audio signal is stable at 3.5.

As described in step 505, the MOS of a usual network call is in an interval (3, 4.5). The server divides a sample data set every 0.1 in the interval (3, 4.5), which means that data in Table 1 is divided into 15 sample data sets, and the server can subsequently train 15 bit rate prediction models based on the 15 sample data sets. In this way, when network calls with different MOS requirements are performed, the computer device can select corresponding bit rate prediction models to perform bit rate prediction.

The method for the server to evaluate speech quality is described below. In some embodiments, the server inputs the sample audio signals and the decoded sample audio signals into a speech quality evaluation tool, and the speech quality evaluation tool evaluates the speech quality based on a waveform difference between the sample audio signals and the decoded sample audio signals.

For example, the server inputs the sample audio signals and the decoded sample audio signals into a perceptual evaluation of speech quality (PESQ) tool, and the PESQ tool outputs MOSs. Certainly, the server can also use another speech quality evaluation tool, for example, perceptual analysis measurement system (PAMS), perceptual speech quality measure (PSQM/PSQM+), or perceptual objective listening quality analysis (POLQA). This is not limited in the embodiments of this disclosure.

702: The server inputs the plurality of pieces of sample frequency domain information into an initial model, and the initial model performs bit rate prediction based on the plurality of pieces of sample frequency domain information, to output a plurality of predicted bit rates corresponding to the plurality of pieces of sample frequency domain information.

In some embodiments, the bit rate prediction model in this embodiment of this disclosure is any neural network structure, for example, a deep neural network (DNN), a convolutional neural network (CNN), or a recurrent neural network (RNN). This is not limited in the embodiments of this disclosure.

In some embodiments, the server initializes a model parameter of the initial model. The initial model performs calculation based on the plurality of pieces of sample frequency domain information and the model parameter, and outputs the plurality of predicted bit rates corresponding to the plurality of pieces of sample frequency domain information.

In an example in which a DNN is used, the server initializes the DNN to obtain a plurality of initial weight matrices and fully-connected layers. After the server inputs the first piece of sample frequency domain information into the DNN, the DNN performs calculation for the sample frequency domain information based on the initial weight matrix, and then obtains a predicted bit rate after the fully-connected layer performs fully-connected processing. In some embodiments, in a process in which the server performs fully-connected processing, normalization processing can be further performed, and the predicted bit rate is obtained through normalization processing. The server can implement the normalization processing based on a softmax function.

In an example in which a CNN is used, the server initializes the CNN to obtain a plurality of initial convolution kernels and fully-connected layers. The server inputs a piece of sample frequency domain information into the CNN, performs convolution processing on the sample frequency domain information by using the initial convolution kernel, and then performs fully-connected processing and normalization processing by using the fully-connected layer, to obtain a predicted bit rate.

703: The server adjusts a model parameter of the initial model based on difference information between the sample bit rates and the predicted bit rates, continues to train the initial model until the model parameter of the initial model meets a target cut-off condition, and uses the trained initial model as a bit rate prediction model.

In some embodiments, the server obtains the difference information between the sample bit rates corresponding to the sample audio signals and the predicted bit rates, and adjusts the model parameter of the initial model based on the difference information.

In an example in which a DNN is used, the server adjusts parameters of the weight matrix and the fully-connected layer based on the difference information, to obtain the updated initial model, and then inputs the next piece of sample frequency domain information into the updated initial model, so that the updated initial model outputs a predicted bit rate corresponding to the next piece of sample frequency domain information. The server then adjusts the model parameter of the updated initial model based on a sample bit rate corresponding to the next sample audio signal and the predicted bit rate, stops training the initial model after a target quantity of iterations is reached, and uses the trained initial model as the bit rate prediction model.

The following describes a method for the server to adjust the parameters of the weight matrix and the fully-connected layer based on the difference information.

In some embodiments, the server constructs a loss function based on the difference information. In an iteration process, the server determines a gradient of the loss function, and adjusts the parameters of the weight matrix and the fully-connected layer according to a direction of the gradient, to decrease the gradient of the loss function. This method can also be referred to as gradient descent. The loss function is iterated a plurality of times in the gradient descent method to adjust the parameters of the weight matrix and the fully-connected layer.

Figure 9:
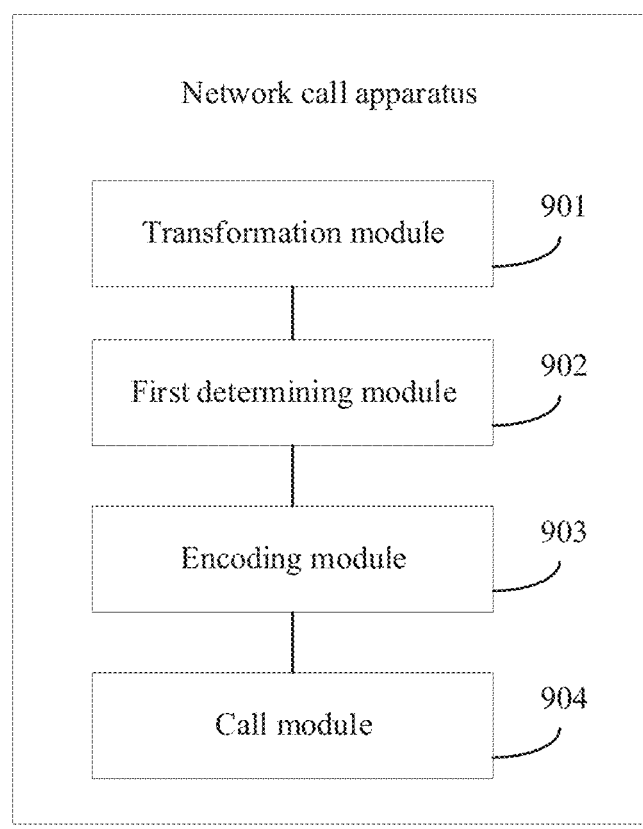
FIG. 9 is a schematic structural diagram of a network call apparatus according to an embodiment of this disclosure.

FIG. 9 is a schematic structural diagram of a network call apparatus according to an embodiment of this disclosure. Referring to FIG. 9, the apparatus includes: a transformation module 901, a first determining module 902, an encoding module 903, and a call module 904.

The transformation module 901 is configured to perform time-frequency transformation on an acquired audio signal, to obtain a plurality of pieces of frequency domain information of the audio signal.

The first determining module 902 is configured to determine a target bit rate corresponding to the audio signal according to the plurality of pieces of frequency domain information.

The encoding module 903 is configured to encode the audio signal based on the target bit rate.

The call module 904 is configured to perform a network call based on the encoded audio signal.

In some embodiments, the first determining module includes:
 a first input unit, configured to input the plurality of pieces of frequency domain information into a bit rate prediction model, so that the bit rate prediction model outputs a plurality of first bit rates that enable the speech quality of the network call to meet a target speech quality condition; and
 a first determining unit, configured to determine a first bit rate that meets a target condition from the plurality of first bit rates as the target bit rate.

In some embodiments, the apparatus further includes:
 a training module, configured to perform model training based on a sample data set to obtain the bit rate prediction model, the sample data set including a plurality of sample audio signals and sample bit rates corresponding to the plurality of sample audio signals, the plurality of sample audio signals all meeting the same speech quality condition.

In some embodiments, the apparatus further includes:
 a codec module, configured to encode and then decode the plurality of sample audio signals based on the sample bit rates corresponding to the plurality of sample audio signals to obtain a plurality of decoded sample audio signals; and
 a second determining module, configured to determine speech qualities of the plurality of sample audio signals based on the plurality of sample audio signals and the plurality of decoded sample audio signals.

In some embodiments, the training module includes:
a first transformation unit, configured to perform time-frequency transformation on the plurality of sample audio signals to obtain a plurality of pieces of sample frequency domain information;
an input unit, configured to input the plurality of pieces of sample frequency domain information into an initial model;
a prediction unit, configured to perform, by the initial model, bit rate prediction based on the plurality of pieces of sample frequency domain information, to output a plurality of predicted bit rates corresponding to the plurality of pieces of sample frequency domain information; and
a first adjusting unit, configured to adjust a model parameter of the initial model based on difference information between the sample bit rates and the predicted bit rates, continue to train the initial model until the model parameter of the initial model meets a target cut-off condition, and use the trained initial model as the bit rate prediction model.

In some embodiments, the transformation module includes:
a first dividing unit, configured to divide the audio signal into a plurality of audio frames, two audio frames adjacent in time having an overlapping part;
a windowing unit, configured to perform windowing on the audio frames to obtain a plurality of windowed audio frames; and
a second transformation unit, configured to perform Fourier transformation on the plurality of windowed audio frames to obtain the plurality of pieces of frequency domain information.

In some embodiments, the second transformation unit includes:
a transformation subunit, configured to perform Fourier transformation on the plurality of windowed audio frames to respectively obtain linear frequency-domain parameters of the audio frames;
a first obtaining subunit, configured to respectively obtain linear frequency-domain-power-spectrum values of the audio frames based on the linear frequency-domain parameters of the audio frames;
a second obtaining subunit, configured to obtain a plurality of Bark-domain-power-spectrum values based on the linear frequency-domain-power-spectrum values of the audio frames; and
an operation subunit, configured to perform a logarithmic operation on the plurality of Bark-domain-power-spectrum values to obtain the plurality of pieces of frequency domain information.

In some embodiments, the determining unit includes:
a bit rate group division subunit, configured to divide first bit rates having the same bit rate in the plurality of first bit rates into a bit rate group;
a bit rate group determining subunit, configured to obtain a quantity of the first bit rates included in each bit rate group, and determine a bit rate group including the largest quantity of the first bit rates as a target bit rate group; and
a target bit rate determining subunit, configured to determine the first bit rate included in the target bit rate group as the target bit rate.

In some embodiments, the transformation module is further configured to extract a human voice signal from the audio signal, perform time-frequency transformation on the human voice signal to obtain a plurality of pieces of frequency domain information of the human voice signal, and use the plurality of pieces of frequency domain information of the human voice signal as the plurality of pieces of frequency domain information of the audio signal; or recognize a start time point and an end time point of a human voice in the audio signal, and perform time-frequency transformation on an audio signal between the start time point and the end time point to obtain the plurality of pieces of frequency domain information of the audio signal.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

According to the network call apparatus provided by this embodiment of this disclosure, a computer device performs time-frequency transformation on an audio signal to obtain frequency domain information, and a trained bit rate prediction model predicts a target bit rate based on the frequency domain information. Because the bit rate prediction model is trained based on sample audio signals corresponding to specific speech quality and sample bit rates, a relationship between the audio signal and the speech quality is considered when the model performs bit rate prediction. That is, when the model is used for performing bit rate prediction, the goal of encoding is to make the audio signal get the specific speech quality. The audio signal is adjusted by using the target bit rate outputted by the model, so that the speech quality of a network call is more stable and the quality of the network call is better.

When the network call apparatus provided in the foregoing embodiments performs a network call, the division of the foregoing functional modules is merely an example for description. In actual application, the functions may be allocated to and completed by different functional modules according to requirements, that is, the internal structure of the computer device is divided into different functional modules, to implement all or some of the functions described above. In addition, the network call apparatus provided in the foregoing embodiment is based on the same concept as the network call method in the foregoing embodiments. For an implementation process, refer to the method embodiments, and details are not described herein again.

Figure 10:
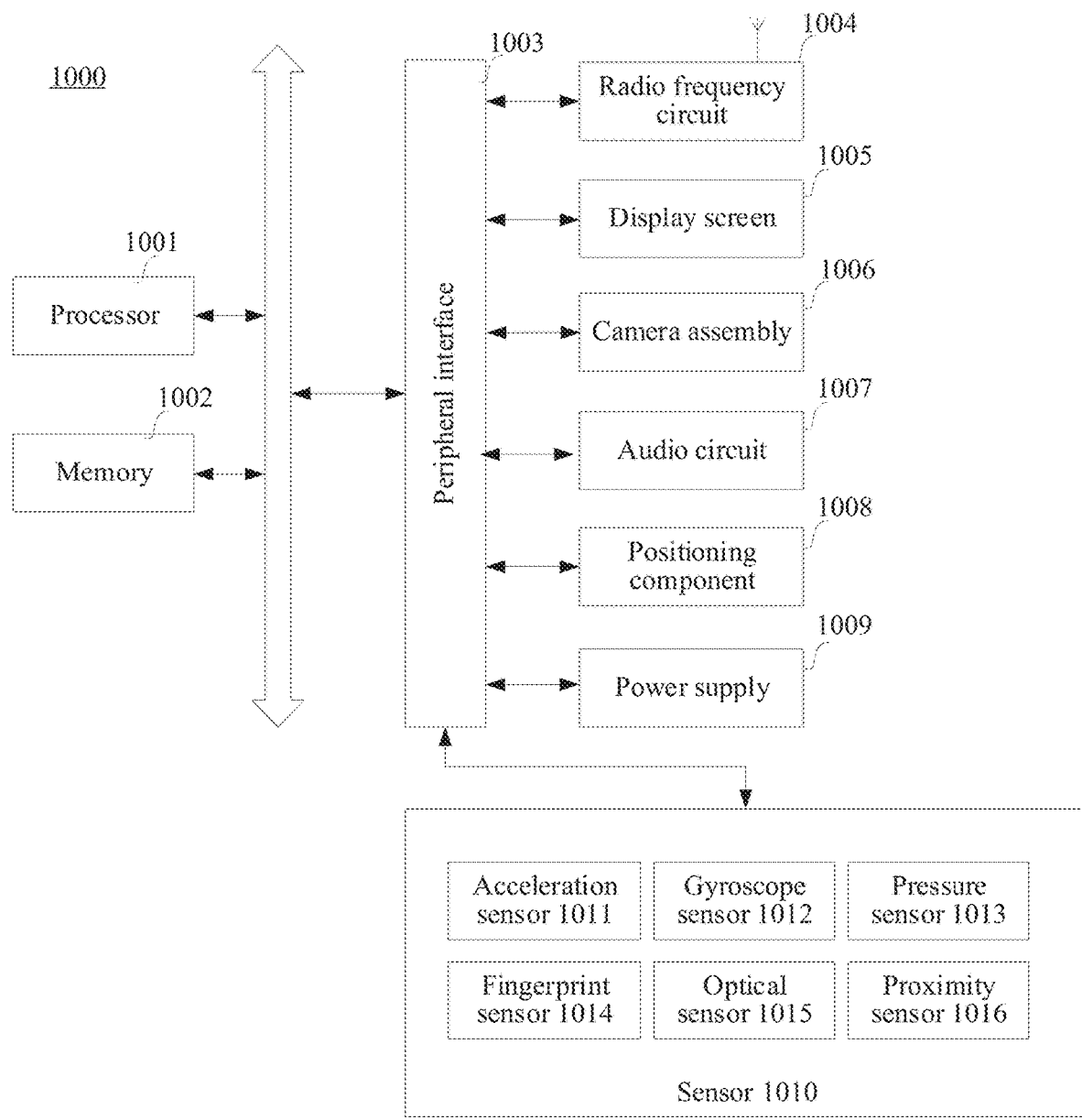
FIG. 10 is a schematic structural diagram of a computer device according to an embodiment of this disclosure.

FIG. 10 is a schematic structural diagram of a computer device 1000 according to an embodiment of this disclosure. In some embodiments, the computer device 1000 is a notebook computer or a desktop computer. The computer device 1000 may also be referred to as user equipment (UE), a portable computer device, a laptop computer device, a desktop computer device, or another name.

The computer device 1000 includes one or more processors 1001 and one or more memories 1002.

In some embodiments, the processor 1001 may include one or more processing cores, for example, may be a 4-core processor or an 8-core processor. The processor 1001 may be implemented in at least one hardware form of a digital signal processor (DSP), a field-programmable gate array (FPGA), and a programmable logic array (PLA). In some embodiments, the processor 1001 includes a main processor and a coprocessor. The main processor is a processor configured to process data in an awake state, and is also referred to as a central processing unit (CPU). The coprocessor is a low power consumption processor configured to process data in a standby state. In some embodiments, the processor 1001 may be integrated with a graphics processing unit (GPU). The GPU is configured to render and draw content that needs to be displayed on a display screen. In some embodiments, the processor 1001 may further include an AI processor. The AI processor is configured to process a calculation operation related to machine learning.

In some embodiments, the memory 1002 includes one or more non-transitory computer-readable storage media. The computer-readable storage medium is non-transient. In some embodiments, the memory 1002 further includes a high-speed random access memory and a non-volatile memory, such as one or more magnetic disk storage devices or flash storage devices. In some embodiments, a non-transient computer-readable storage medium in the memory 1002 is configured to store at least one piece of program code, and the at least one piece of program code is configured to be executed by the processor 1001 to implement the following steps:

performing time-frequency transformation on an acquired audio signal, to obtain a plurality of pieces of frequency domain information of the audio signal;

determining a target bit rate corresponding to the audio signal according to the plurality of pieces of frequency domain information; and encoding the audio signal based on the target bit rate, and performing a network call based on the encoded audio signal.

In some embodiments, the processor 1001 is mainly configured to perform the following operations:

inputting the plurality of pieces of frequency domain information into a bit rate prediction model, so that the bit rate prediction model outputs a plurality of first bit rates that enable the speech quality of the network call to meet a target speech quality condition; and determining a first bit rate that meets a target condition from the plurality of first bit rates as the target bit rate.

In some embodiments, the processor 1001 is configured to perform the following operations:

dividing first bit rates having the same bit rate in the plurality of first bit rates into a bit rate group;

obtaining a quantity of the first bit rates included in each bit rate group, and determining a bit rate group including the largest quantity of the first bit rates as a target bit rate group; and determining the first bit rate included in the target bit rate group as the target bit rate.

In some embodiments, the processor 1001 is configured to perform the following operation:

performing model training based on a sample data set to obtain the bit rate prediction model, the sample data set including a plurality of sample audio signals and sample bit rates corresponding to the plurality of sample audio signals, the plurality of sample audio signals all meeting the same speech quality condition.

In some embodiments, the processor 1001 is configured to perform the following operations:

encoding and then decoding the plurality of sample audio signals based on the sample bit rates corresponding to the plurality of sample audio signals to obtain a plurality of decoded sample audio signals; and determining speech qualities of the plurality of sample audio signals based on the plurality of sample audio signals and the plurality of decoded sample audio signals.

In some embodiments, the processor 1001 is configured to perform the following operations:

performing time-frequency transformation on the plurality of sample audio signals to obtain a plurality of pieces of sample frequency domain information;

inputting the plurality of pieces of sample frequency domain information into an initial model;

performing, by the initial model, bit rate prediction based on the plurality of pieces of sample frequency domain information, to output a plurality of predicted bit rates corresponding to the plurality of pieces of sample frequency domain information; and adjusting a model parameter of the initial model based on difference information between the sample bit rates and the predicted bit rates, continuing to train the initial model until the model parameter of the initial model meets a target cut-off condition, and using the trained initial model as the bit rate prediction model.

In some embodiments, the processor 1001 is configured to perform the following operations:

dividing the audio signal into a plurality of audio frames, two audio frames adjacent in time having an overlapping part;

performing windowing on the audio frames to obtain a plurality of windowed audio frames; and performing Fourier transformation on the plurality of windowed audio frames to obtain the plurality of pieces of frequency domain information.

In some embodiments, the processor 1001 is configured to perform the following operations:

performing Fourier transformation on the plurality of windowed audio frames to respectively obtain linear frequency-domain parameters of the audio frames;

respectively obtaining linear frequency-domain-power-spectrum values of the audio frames based on the linear frequency-domain parameters of the audio frames;

obtaining a plurality of Bark-domain-power-spectrum values based on the linear frequency-domain-power-spectrum values of the audio frames; and performing a logarithmic operation on the plurality of Bark-domain-power-spectrum values to obtain the plurality of pieces of frequency domain information.

In some embodiments, the processor 1001 is configured to perform the following operation:

extracting a human voice signal from the audio signal, performing time-frequency transformation on the human voice signal to obtain a plurality of pieces of frequency domain information of the human voice signal, and using the plurality of pieces of frequency domain information of the human voice signal as the plurality of pieces of frequency domain information of the audio signal; or recognizing a start time point and an end time point of a human voice in the audio signal, and performing time-frequency transformation on an audio signal between the start time point and the end time point to obtain the plurality of pieces of frequency domain information of the audio signal.

In some embodiments, the computer device 1000 further optionally includes a peripheral interface 1003 and at least one peripheral. The processor 1001, the memory 1002, and the peripheral interface 1003 may be connected by using a bus or a signal cable. Each peripheral may be connected to the peripheral interface 1003 by using a bus, a signal cable, or a circuit board. In some embodiments, the peripheral includes: at least one of a radio frequency (RF) circuit 1004, a display screen 1005, a camera assembly 1006, an audio circuit 1007, a positioning component 1008, and a power supply 1009.

The peripheral interface 1003 may be configured to connect at least one input/output (I/O)-related peripheral to the processor 1001 and the memory 1002. In some embodiments, the processor 1001, the memory 1002, and the peripheral interface 1003 are integrated on the same chip or circuit board. In some other embodiments, any one or two of the processor 1001, the memory 1002, and the peripheral interface 1003 may be implemented on a separate chip or circuit board, which is not limited in this embodiment.

The RF circuit 1004 is configured to receive and transmit an RF signal, also referred to as an electromagnetic signal. The RF circuit 1004 communicates with a communication network and another communications device by using the electromagnetic signal. The RF circuit 1004 converts an electrical signal into an electromagnetic signal for transmission, or converts a received electromagnetic signal into an electrical signal. In some embodiments, the RF circuit 1004 includes: an antenna system, an RF transceiver, one or more amplifiers, a tuner, an oscillator, a digital signal processor, a codec chip set, a subscriber identity module card, and the like. The RF circuit 1004 may communicate with other computer devices through at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the RF circuit 1004 may further include a circuit related to near field communication (NFC), which is not limited in this disclosure.

The display screen 1005 is configured to display a user interface (UI). The UI may include a graphic, a text, an icon, a video, and any combination thereof. When the display screen 1005 is a touch display screen, the display screen 1005 is further capable of acquiring touch signals on or above a surface of the display screen 1005. The touch signal may be inputted to the processor 1001 as a control signal for processing. In this case, the display screen 1005 may be further configured to provide a virtual button and/or a virtual keyboard, which is also referred to as a soft button and/or a soft keyboard. In some embodiments, there may be one display screen 1005, disposed on a front panel of the computer device 1000. In some other embodiments, there may be at least two display screens 1005, respectively disposed on different surfaces of the computer device 1000 or designed in a foldable shape. In still some other embodiments, the display screen 1005 may be a flexible display screen, disposed on a curved surface or a folded surface of the computer device 1000. Even, the display screen 1005 may be further set in a non-rectangular irregular pattern, namely, a special-shaped screen. The display screen 1005 may be made of materials such as a liquid crystal display (LCD), an organic light-emitting diode (OLED), and the like.

The camera assembly 1006 is configured to acquire images or videos. In some embodiments, the camera assembly 1006 includes a front-facing camera and a rear-facing camera. Generally, the front-facing camera is disposed on the front panel of the computer device, and the rear-facing camera is disposed on a back face of the computer device. In some embodiments, there are at least two rear-facing cameras, which are respectively any of a main camera, a depth-of-field camera, a wide-angle camera, and a telephoto camera, to achieve background blurring function through fusion of the main camera and the depth-of-field camera, panoramic photographing and virtual reality (VR) photographing through fusion of the main camera and the wide-angle camera, or other fusion photographing functions. In some embodiments, the camera assembly 1006 may further include a flash. The flash may be a single color temperature flash or a double color temperature flash. The double color temperature flash refers to a combination of a warm light flash and a cold light flash, and may be used for light compensation under different color temperatures.

The audio circuit 1007 may include a microphone and a speaker. The microphone is configured to acquire sound waves of a user and an environment, and convert the sound waves into an electrical signal to input to the processor 1001 for processing, or input to the RF circuit 1004 for implementing voice communication. For the purpose of stereo sound acquisition or noise reduction, there may be a plurality of microphones, respectively disposed at different parts of the computer device 1000. The microphone may be further a microphone array or an omnidirectional collection microphone. The speaker is configured to convert electric signals from the processor 1001 or the RF circuit 1004 into sound waves. The speaker may be a conventional thin-film speaker or a piezoelectric ceramic speaker. When the speaker is the piezoelectric ceramic speaker, the speaker can not only convert electrical signals into sound waves audible to a human being, but also convert electrical signals into sound waves inaudible to the human being for ranging and other purposes. In some embodiments, the audio circuit 1007 may also include an earphone jack.

The positioning component 1008 is configured to determine a current geographic location of the computer device 1000 through positioning, to implement navigation or a location based service (LBS). The positioning component 1008 may be a positioning component based on the global positioning system (GPS) of the United States, the BeiDou Navigation Satellite System (BDS) of China, the GLONASS System of Russia, or the GALILEO System of the European Union.

The power supply 1009 is configured to supply power to components in the computer device 1000. The power supply 1009 may be an alternating current, a direct current, a primary battery, or a rechargeable battery. When the power supply 1009 includes the rechargeable battery, the rechargeable battery may be a wired rechargeable battery or a wireless rechargeable battery. The rechargeable battery may be further configured to support a fast charge technology.

In some embodiments, the computer device 1000 may further include one or more sensors 1010. The one or more sensors 1010 include, but are not limited to: an acceleration sensor 1011, a gyro sensor 1012, a pressure sensor 1013, a fingerprint sensor 1014, an optical sensor 1015, and a proximity sensor 1016.

The acceleration sensor 1011 may detect accelerations on three coordinate axes of a coordinate system established by the computer device 1000. For example, the acceleration sensor 1011 may be configured to detect components of gravity acceleration on the three coordinate axes. The processor 1001 may control, according to a gravity acceleration signal acquired by the acceleration sensor 1011, the display screen 1005 to display the user interface in a frame view or a portrait view. The acceleration sensor 1011 may be further configured to acquire motion data of a game or a user.

The gyroscope sensor 1012 may detect a body direction and a rotation angle of the computer device 1000. The gyroscope sensor 1012 may cooperate with the acceleration sensor 1011 to collect a 3D action by the user on the computer device 1000. The processor 1001 may implement the following functions according to the data acquired by the gyroscope sensor 1012: motion sensing (such as changing the UI according to a tilt operation of the user), image stabilization during shooting, game control, and inertial navigation.

The pressure sensor 1013 may be disposed on a side frame of the computer device 1000 and/or a lower layer of the display screen 1005. In a case that the pressure sensor 1013 is disposed on the side frame of the computer device 1000, a holding signal of the user on the computer device 1000 may be detected. The processor 1001 performs left and right hand recognition or a quick operation according to the holding signal acquired by the pressure sensor 1013. When the pressure sensor 1013 is disposed on the low layer of the display screen 1005, the processor 1001 controls, according to a pressure operation of the user on the display screen 1005, an operable control on the UI. The operable control includes at least one of a button control, a scroll-bar control, an icon control, and a menu control.

The fingerprint sensor 1014 is configured to acquire a user's fingerprint, and the processor 1001 identifies a user's identity according to the fingerprint acquired by the fingerprint sensor 1014, or the fingerprint sensor 1014 identifies a user's identity according to the acquired fingerprint. When the identity of the user is identified as a trusted identity, the processor 1001 authorizes the user to perform a related sensitive operation. The sensitive operation includes unlocking a screen, viewing encrypted information, downloading software, payment, changing settings, and the like. The fingerprint sensor 1014 may be disposed on a front face, a back face, or a side face of the computer device 1000. When a physical button or a vendor logo is disposed on the computer device 1000, the fingerprint sensor 1014 may be integrated together with the physical button or the vendor logo.

The optical sensor 1015 is configured to acquire ambient light intensity. In some embodiments, the processor 1001 may control display brightness of the display screen 1005 according to the ambient light intensity acquired by the optical sensor 1015. In some embodiments, in a case that the ambient light intensity is relatively high, the display luminance of the display screen 1005 is increased, and in a case that the ambient light intensity is relatively low, the display luminance of the touch display screen 1005 is reduced. In another embodiment, the processor 1001 may further dynamically adjust a camera parameter of the camera assembly 1006 according to the ambient light intensity acquired by the optical sensor 1015.

The proximity sensor 1016, also referred to as a distance sensor, is usually disposed on the front panel of the computer device 1000. The proximity sensor 1016 is configured to acquire a distance between a front face of the user and the front face of the computer device 1000. In some embodiments, when the proximity sensor 1016 detects that the distance between the front face of the user and the front face of the computer device 1000 is gradually decreased, the processor 1001 controls the display screen 1005 to switch from a screen-on state to a screen-off state. When the proximity sensor 1016 detects that the distance between the front face of the user and the front face of the computer device 1000 is gradually increased, the processor 1001 controls the display screen 1005 to switch from the screen-off state to the screen-on state.

A person skilled in the art may understand that the structure shown in FIG. 10 does not constitute any limitation on the computer device 1000, and the computer device may include more components or fewer components than those shown in the figure, or some components may be combined, or a different component deployment may be used.

In an exemplary embodiment, a storage medium, for example, a memory including program code is further provided. For example, the storage medium may be a read-only memory (ROM), a random access memory (RAM), a compact disc read-only memory (CD-ROM), a magnetic tape, a floppy disk, an optical data storage device, or the like. The program code may be executed by a processor to implement the following steps:

performing time-frequency transformation on an acquired audio signal, to obtain a plurality of pieces of frequency domain information of the audio signal;

determining a target bit rate corresponding to the audio signal according to the plurality of pieces of frequency domain information; and encoding the audio signal based on the target bit rate, and performing a network call based on the encoded audio signal.

In some embodiments, the processor is configured to perform the following operations:

inputting the plurality of pieces of frequency domain information into a bit rate prediction model, so that the bit rate prediction model outputs a plurality of first bit rates that enable the speech quality of the network call to meet a target speech quality condition; and determining a first bit rate that meets a target condition from the plurality of first bit rates as the target bit rate.

In some embodiments, the processor is configured to perform the following operations:

classifying first bit rates having the same bit rate value in the plurality of first bit rates into a bit rate group;

obtaining a quantity of the first bit rates included in each bit rate group, and determining a bit rate group including the largest quantity of the first bit rates as a target bit rate group; and determining the first bit rate included in the target bit rate group as the target bit rate.

In some embodiments, the processor is configured to perform the following operations:

performing model training based on a sample data set to obtain the bit rate prediction model, the sample data set including a plurality of sample audio signals and sample bit rates corresponding to the plurality of sample audio signals, the plurality of sample audio signals all meeting the same speech quality condition.

In some embodiments, the processor is configured to perform the following operations:

encoding and then decoding the plurality of sample audio signals based on the sample bit rates corresponding to the plurality of sample audio signals to obtain a plurality of decoded sample audio signals; and determining speech qualities of the plurality of sample audio signals based on the plurality of sample audio signals and the plurality of decoded sample audio signals.

In some embodiments, the processor is configured to perform the following operations:

performing time-frequency transformation on the plurality of sample audio signals to obtain a plurality of pieces of sample frequency domain information;

inputting the plurality of pieces of sample frequency domain information into an initial model;

performing, by the initial model, bit rate prediction based on the plurality of pieces of sample frequency domain information, to output a plurality of predicted bit rates corresponding to the plurality of pieces of sample frequency domain information; and adjusting a model parameter of the initial model based on difference information between the sample bit rates and the predicted bit rates, continuing to train the initial model until the model parameter of the initial model meets a target cut-off condition, and using the trained initial model as the bit rate prediction model.

In some embodiments, the processor is configured to perform the following operations:

dividing the audio signal into a plurality of audio frames, two audio frames adjacent in time having an overlapping part;

performing windowing on the audio frames to obtain a plurality of windowed audio frames; and performing Fourier transformation on the plurality of windowed audio frames to obtain the plurality of pieces of frequency domain information.

In some embodiments, the processor is configured to perform the following operations:

performing Fourier transformation on the plurality of windowed audio frames to respectively obtain linear frequency-domain parameters of the audio frames;

respectively obtaining linear frequency-domain-power-spectrum values of the audio frames based on the linear frequency-domain parameters of the audio frames;

obtaining a plurality of Bark-domain-power-spectrum values based on the linear frequency-domain-power-spectrum values of the audio frames; and performing a logarithmic operation on the plurality of Bark-domain-power-spectrum values to obtain the plurality of pieces of frequency domain information.

In some embodiments, the processor is configured to perform the following operation:

extracting a human voice signal from the audio signal, performing time-frequency transformation on the human voice signal to obtain a plurality of pieces of frequency domain information of the human voice signal, and using the plurality of pieces of frequency domain information of the human voice signal as the plurality of pieces of frequency domain information of the audio signal; or recognizing a start time point and an end time point of a human voice in the audio signal, and performing time-frequency transformation on an audio signal between the start time point and the end time point to obtain the plurality of pieces of frequency domain information of the audio signal.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely optional embodiments of this disclosure, but are not intended to limit this disclosure. Any modification, equivalent replacement, or improvement made within the spirit and principle of this disclosure shall fall within the protection scope of this disclosure.

What is claimed is:

1. A network call method, applicable to a computer device, the method comprising:

performing time-frequency transformation on an acquired audio signal to obtain a plurality of pieces of frequency domain information of the audio signal;

prior to encoding the audio signal, inputting the plurality of pieces of frequency domain information into a bit rate prediction model to obtain a plurality of first candidate bit rates, the plurality of first candidate bit rates being sufficient to meet a target speech quality condition, the bit rate prediction model being pre-trained based on training audio data of different coding quality requirements;

determining a first bit rate that meets a target condition from the plurality of first candidate bit rates as a target bit rate;

encoding the audio signal based on the target bit rate; and performing a network call based on the encoded audio signal.

2. The method according to claim 1, wherein determining the first bit rate that meets the target condition from the plurality of first candidate bit rates as the target bit rate comprises:

classifying the plurality of first candidate bit rates having same bit rate values into bit rate groups;

obtaining a quantity of each bit rate group; and determining a bit rate of a bit rate group having largest quantity as the target bit rate.

3. The method according to claim 1, further comprising:

performing model training based on a sample data set to obtain the bit rate prediction model, the sample data set comprising a plurality of sample audio signals and sample bit rates corresponding to the plurality of sample audio signals, the plurality of sample audio signals meeting a same speech quality condition.

4. The method according to claim 3, wherein before performing model training based on the sample data set to obtain the bit rate prediction model, the method further comprises:

encoding and then decoding the plurality of sample audio signals based on the sample bit rates corresponding to the plurality of sample audio signals to obtain a plurality of decoded sample audio signals; and determining speech qualities of the plurality of sample audio signals based on the plurality of sample audio signals and the plurality of decoded sample audio signals.

5. The method according to claim 3, wherein performing model training based on the sample data set to obtain the bit rate prediction model comprises:

performing time-frequency transformation on the plurality of sample audio signals to obtain a plurality of pieces of sample frequency domain information;

inputting the plurality of pieces of sample frequency domain information into an initial model;

performing, by the initial model, bit rate prediction based on the plurality of pieces of sample frequency domain information to obtain a plurality of predicted bit rates corresponding to the plurality of pieces of sample frequency domain information;

iteratively adjust one or more model parameters of the initial model based on differential information between the sample bit rates and the predicted bit rates until a target cut-off condition is met; and using the initial model with the adjusted one or more model parameters as the bit rate prediction model.

6. The method according to claim 1, wherein performing time-frequency transformation on the acquired audio signal to obtain the plurality of pieces of frequency domain information comprises:
dividing the audio signal into a plurality of audio frames, two audio frames adjacent in time having an overlapping part;
performing windowing on the audio frames to obtain a plurality of windowed audio frames; and
performing Fourier transformation on the plurality of windowed audio frames to obtain the plurality of pieces of frequency domain information.

7. The method according to claim 6, wherein performing Fourier transformation on the plurality of windowed audio frames to obtain the plurality of pieces of frequency domain information comprises:
performing Fourier transformation on the plurality of windowed audio frames to obtain linear frequency-domain parameters of the audio frames;
obtaining linear frequency-domain-power-spectrum values of the audio frames based on the linear frequency-domain parameters of the audio frames;
obtaining a plurality of Bark-domain-power-spectrum values based on the linear frequency-domain-power-spectrum values of the audio frames; and
performing a logarithmic operation on the plurality of Bark-domain-power-spectrum values to obtain the plurality of pieces of frequency domain information.

8. The method according to claim 1, wherein performing time-frequency transformation on the acquired audio signal to obtain the plurality of pieces of frequency domain information of the audio signal comprises:
extracting a human voice signal from the audio signal, performing time-frequency transformation on the human voice signal to obtain the plurality of pieces of frequency domain information of the audio signal; or
recognizing a start time point and an end time point of a human voice in the audio signal, and performing time-frequency transformation on a portion of the audio signal between the start time point and the end time point to obtain the plurality of pieces of frequency domain information of the audio signal.

9. A computer device, comprising one or more processors and one or more memories, the one or more memories storing at least one program code, the at least one program code, when being loaded and executed by the one or more processors, causing the computer device to perform steps, comprising:
performing time-frequency transformation on an acquired audio signal to obtain a plurality of pieces of frequency domain information of the audio signal;
prior to encoding the audio signal, inputting the plurality of pieces of frequency domain information into a bit rate prediction model to obtain a plurality of first candidate bit rates, the plurality of first candidate bit rates being sufficient to meet a target speech quality condition, the bit rate prediction model being pre-trained based on training audio data of different coding quality requirements;
determining a first bit rate that meets a target condition from the plurality of first candidate bit rates as a target bit rate;
encoding the audio signal based on the target bit rate; and
performing a network call based on the encoded audio signal.

10. The computer device according to claim 9, wherein the one or more processors are configured to cause the computer device to perform the steps comprising:
classifying the plurality of first candidate bit rates having the same bit rate value into a bit rate group;
obtaining a quantity of each bit rate group; and
determining a bit rate of a bit rate group having largest quality as the target bit rate.

11. The computer device according to claim 9, wherein the one or more processors are configured to cause the computer device to perform the steps comprising:
performing model training based on a sample data set to obtain the bit rate prediction model, the sample data set comprising a plurality of sample audio signals and sample bit rates corresponding to the plurality of sample audio signals, the plurality of sample audio signals meeting a same speech quality condition.

12. The computer device according to claim 11, wherein the one or more processors are configured to cause the computer device to perform the steps comprising:
encoding and then decoding the plurality of sample audio signals based on the sample bit rates corresponding to the plurality of sample audio signals to obtain a plurality of decoded sample audio signals; and
determining speech qualities of the plurality of sample audio signals based on the plurality of sample audio signals and the plurality of decoded sample audio signals.

13. The computer device according to claim 11, wherein the one or more processors are configured to cause the computer device to perform the steps comprising:
performing time-frequency transformation on the plurality of sample audio signals to obtain a plurality of pieces of sample frequency domain information;
inputting the plurality of pieces of sample frequency domain information into an initial model;
performing, by the initial model, bit rate prediction based on the plurality of pieces of sample frequency domain information to obtain a plurality of predicted bit rates corresponding to the plurality of pieces of sample frequency domain information;
iteratively adjust one or more model parameters of the initial model based on differential information between the sample bit rates and the predicted bit rates until a target cut-off condition is met; and
using the initial model with the adjusted one or more model parameters as the bit rate prediction model.

14. The computer device according to claim 9, wherein the one or more processors are configured to cause the computer device to perform the steps comprising:
dividing the audio signal into a plurality of audio frames, two audio frames adjacent in time having an overlapping part;
performing windowing on the audio frames to obtain a plurality of windowed audio frames; and
performing Fourier transformation on the plurality of windowed audio frames to obtain the plurality of pieces of frequency domain information.

15. The computer device according to claim 14, wherein the one or more processors are configured to cause the computer device to perform the steps comprising:
performing Fourier transformation on the plurality of windowed audio frames to obtain linear frequency-domain parameters of the audio frames;
obtaining linear frequency-domain-power-spectrum values of the audio frames based on the linear frequency-domain parameters of the audio frames;

obtaining a plurality of Bark-domain-power-spectrum values based on the linear frequency-domain-power-spectrum values of the audio frames; and performing a logarithmic operation on the plurality of Bark-domain-power-spectrum values to obtain the plurality of pieces of frequency domain information.

16. The computer device according to claim 9, wherein the one or more processors are configured to cause the computer device to perform the steps comprising:

extracting a human voice signal from the audio signal, performing time-frequency transformation on the human voice signal to obtain the plurality of pieces of frequency domain information of the audio signal; or recognizing a start time point and an end time point of a human voice in the audio signal, and performing time-frequency transformation on a portion of the audio signal between the start time point and the end time point to obtain the plurality of pieces of frequency domain information of the audio signal.

17. A non-transitory computer-readable storage medium, storing at least one program code, the at least one program code being loaded and executed by a processor to cause a computer device to perform steps comprising:

performing time-frequency transformation on an acquired audio signal, to obtain a plurality of pieces of frequency domain information of the audio signal;

prior to encoding the audio signal, inputting the plurality of pieces of frequency domain information into a bit rate prediction model to obtain a plurality of first candidate bit rates, the plurality of first candidate bit rates being sufficient to meet a target speech quality condition, the bit rate prediction model being pre-trained based on training audio data of different coding quality requirements;

determining a first bit rate that meets a target condition from the plurality of first candidate bit rates as a target bit rate;

encoding the audio signal based on the target bit rate; and performing a network call based on the encoded audio signal.

* * * * *